United States Patent
Candelaria et al.

(10) Patent No.: US 9,378,154 B2
(45) Date of Patent: Jun. 28, 2016

(54) SECURE RESERVATION MODE FOR LOGICAL UNIT NUMBERS AND PERSISTENT RESERVATIONS

(71) Applicant: International Business Machines Corporation, Armonk, NY (US)

(72) Inventors: Susan K. Candelaria, Tucson, AZ (US); Scott B. Compton, Hyde Park, NY (US); Jared M. Minch, Tucson, AZ (US); Richard A. Ripberger, Tuscon, AZ (US); Harry M. Yudenfriend, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 109 days.

(21) Appl. No.: 14/268,445

(22) Filed: May 2, 2014

(65) Prior Publication Data

US 2015/0317254 A1 Nov. 5, 2015

(51) Int. Cl.
*G06F 12/14* (2006.01)
*G06F 21/62* (2013.01)

(52) U.S. Cl.
CPC ............ *G06F 12/14* (2013.01); *G06F 12/1466* (2013.01); *G06F 21/62* (2013.01); *G06F 21/6218* (2013.01); *G06F 2212/1052* (2013.01); *G06F 2221/2141* (2013.01)

(58) Field of Classification Search
CPC . G06F 12/1466; G06F 21/62; G06F 21/6218; G06F 2221/2141; G06F 2212/1052
See application file for complete search history.

(56) References Cited

U.S. PATENT DOCUMENTS

| | | | |
|---|---|---|---|
| 6,954,881 B1 | 10/2005 | Flynn, Jr. et al. | |
| 7,716,406 B1 | 5/2010 | Tyndall | |
| 8,583,876 B2 * | 11/2013 | Taguchi | G06F 3/0622 709/217 |
| 2007/0033358 A1 * | 2/2007 | Sekine | G06F 3/0619 711/163 |
| 2008/0148051 A1 * | 6/2008 | Ozaki | G06F 21/33 713/168 |
| 2009/0151009 A1 * | 6/2009 | Beser | H04L 63/123 726/30 |
| 2010/0077249 A1 * | 3/2010 | Das | G06F 3/0622 714/4.1 |
| 2014/0040410 A1 * | 2/2014 | McDowell | G06F 3/0617 709/212 |
| 2014/0082433 A1 | 3/2014 | Anumalasetty et al. | |

OTHER PUBLICATIONS

List of IBM Patents or Patent Applications Treated as Related; (Appendix P), Filed Aug. 23, 2015; 2 pages.
Susan K. Candelaria, et al., "Secure Reservation Mode for Logical Unit Number and Persistent Reservations", U.S. Appl. No. 14/823,644, filed Aug. 11, 2015.

* cited by examiner

*Primary Examiner* — Edward Dudek, Jr.
(74) *Attorney, Agent, or Firm* — Cantor Colburn LLP; William A. Kinnaman, Jr.

(57) ABSTRACT

A mapping system and method that enables a secure reservation mode for a plurality of logical unit numbers of a storage system, generates a plurality of secret reservation keys, and instructs a distributed client to utilize at least one of the secret reservation keys to register with the storage system and to issue secure persistent reserves to the plurality of logical unit numbers.

14 Claims, 3 Drawing Sheets

SECURE RESERVATION MODE FOR LOGICAL UNIT NUMBERS AND PERSISTENT RESERVATIONS

BACKGROUND

The disclosure relates generally to a system that provides secure access to collected data, and more specifically, to an environment that enables a secure reservation mode on logical unit numbers (LUNs) to support secure persistent reserves.

In general, data management systems utilize protocols to physically connect and transfer data to registered systems. Particularly, data management systems may regulate connections via protocols that reserve LUNs. However, the connections to the LUNs are not constant or persistent because the protocol includes inherent flaws that permit any non-registered system to communicate with the data management system and interrupt the connections.

For example, data management systems may regulate connections to first distributed systems via a small computer system interface (SCSI) protocol that reserve LUNs. Further, when the data management systems utilizes the SCSI protocol, the connections to the LUNs are not constant or persistent because the SCSI protocol includes inherent flaws that permit second distributed systems to communicate with the data management system and interrupt the connections to the first distributed systems. For instance, the first distributed system may generate and utilize reservation keys to register with and reserve LUNs of data management systems in accordance with the SCSI protocol. The second distributed systems may subsequently communicate with the data management systems to retrieve or discover the reservation keys of the first distributed system and utilize the retrieved/discovered reservation keys to impersonate the first distributed systems, including accessing the LUNs and disconnecting the first distributed systems. Since the second distributed systems can access the LUNs (e.g., the reserve is not exclusive to the first distributed systems under the SCSI protocol), the data is exposed. In turn, the data management systems will generally utilize encryption/decryption techniques and/or substitute mechanisms to protect the data of the LUNs.

Encryption/decryption techniques mask the data of the LUNs from the second distributed systems, but are expensive with respect to processing power and add latency for access. Further, encryption/decryption techniques do not solve the second distributed systems' ability to reset the LUN and disconnect the first distributed systems. LUN masking, which is one substitute mechanism, is a technique that disallows access to a particular LUN by the second distributed systems. However, LUN masking manually within the data management systems is not acceptable due to time and cost involved in maintaining LUN masking.

SUMMARY

According to one embodiment of the present invention, a secure reservation mode system and method enables a secure reservation mode for a plurality of logical unit numbers of a storage system, generates a plurality of secret reservation keys, and instructs a distributed client to utilize at least one of the secret reservation keys to register with the storage system and to issue secure persistent reserves to the plurality of logical unit numbers].

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
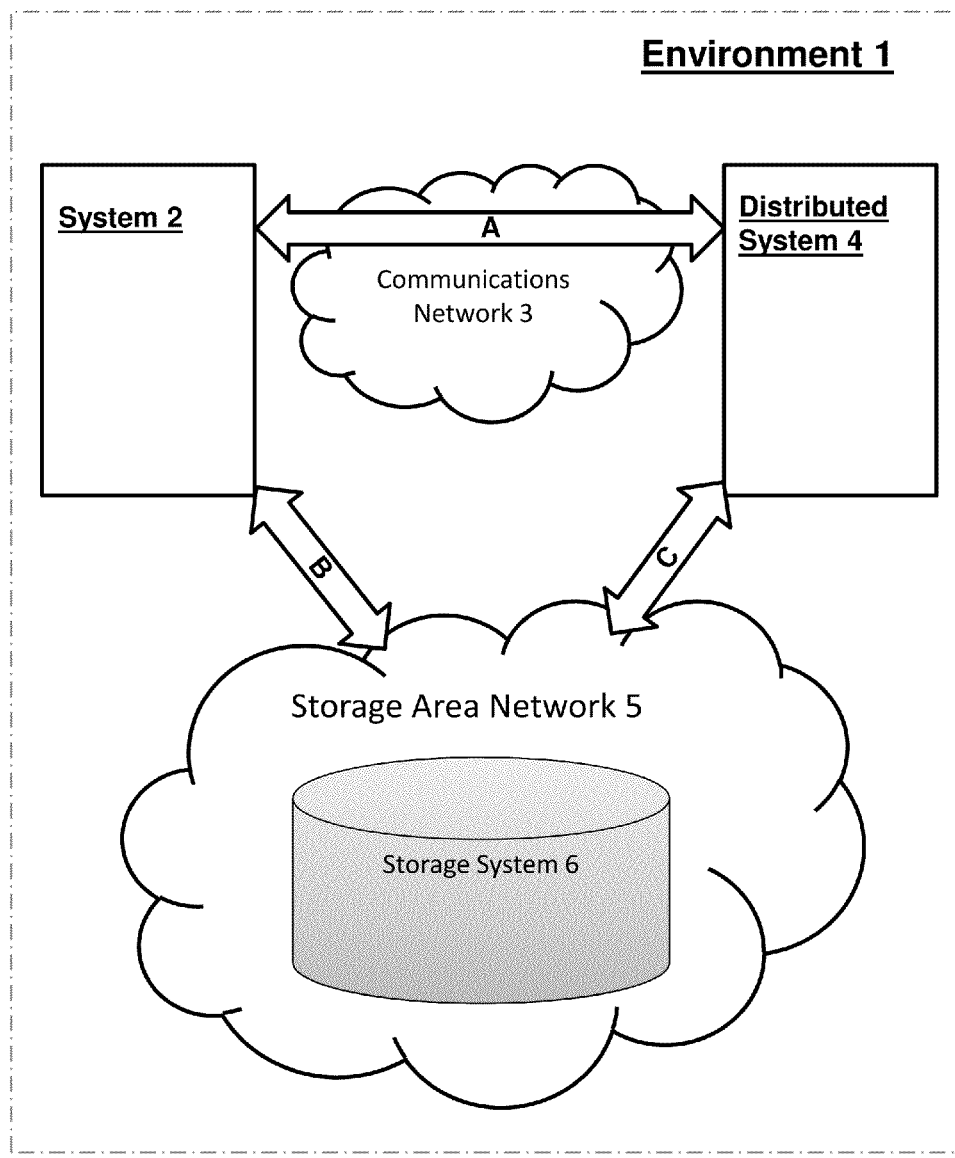
FIG. 1 illustrates an example of an environment for enabling a secure reservation mode.

As indicated above, the data management systems utilize protocols to physically connect and transfer data to registered systems; however, connections are not constant or persistent because the protocol includes inherent flaws that permit any non-registered system to communicate with the data management system and interrupt the connections. Thus, what is needed is system and method that provides persistent, exclusive, and secure access to data by an intended system.

In general, embodiments of the present invention disclosed herein may include a secure reservation mode system, method, and/or computer program product that enables a secure reservation mode on logical unit numbers (LUNs) to support secure persistent reserves. The logical unit number (LUN) is a value used to identify a plurality of devices and/or logical portions of the plurality of devices to support read/write operations of data associated with the identified devices and/or logical portions thereof. The secure persistent reserves are connections to the LUNs that enable only an intended distributed system, or plurality thereof, to access data associated with the LUNs.

For example, the secure reservation mode system and method enables a secure reservation mode for a plurality of logical unit numbers of a storage system, generates a plurality of secret reservation keys, and instructs a distributed client to utilize at least one of the secret reservation keys to register with the storage system and to issue secure persistent reserves to the plurality of logical unit numbers.

Systems and/or computing devices, such as the secure reservation mode system (e.g., environment 1 and systems 2, 4, 6 of FIG. 1), may employ any of a number of computer operating systems, including, but by no means limited to, versions and/or varieties of the AIX UNIX operating system distributed by International Business Machines of Armonk, N.Y., the Microsoft Windows operating system, the Unix operating system (e.g., the Solaris operating system distributed by Oracle Corporation of Redwood Shores, Calif.), the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance. Examples of computing devices include, without limitation, a computer workstation, a server, a desktop, a notebook, a laptop, a network device, a handheld computer, or some other computing system and/or device.

In general, computing devices further may include a processor and a computer readable storage medium, where the processor receives computer readable program instructions, e.g., from the computer readable storage medium, and executes these instructions, thereby performing one or more processes, including one or more of the processes described herein (e.g., enabling a secure reservation mode to support secure persistent reserves).

Computer readable program instructions may be compiled or interpreted from computer programs created using assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on a computing device, partly on the computing device, as a stand-alone software package, partly on a local computing device and partly on a remote computer device or entirely on the remote computer device. In the latter scenario, the remote computer may be connected to the local computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention. Computer readable program instructions described herein may also be downloaded to respective computing/processing devices from a computer readable storage medium or to an external computer or external storage device via a network (e.g., any combination of computing devices and connections that support communication). For example, a network may be the Internet, a local area network, a storage area network, a wide area network and/or a wireless network and comprise a plurality of connections supported by copper transmission cables, optical transmission fibers, wireless transmission, routers, firewalls, switches, gateway computers and/or edge servers that utilize a plurality of communication technologies.

Computer readable storage mediums may be a tangible device that retains and stores instructions for use by an instruction execution device (e.g., a computing device as described above). A computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Thus, the secure reservation mode system and method and/or elements thereof may be implemented as computer readable program instructions on one or more computing devices, stored on computer readable storage medium associated therewith. A computer program product may comprise such computer readable program instructions stored on computer readable storage medium for carrying and/or causing a processor to carry out the operations of the secure reservation mode system and method.

FIG. 1 illustrates a secure reservation mode system as an environment 1 that includes a system 2, a communications network 3, a distributed system 4, a storage area network 5, and a storage system 6. In operation, the system 2 receives through the communications network 3 (e.g., arrow A) from the distributed system 4 a request for access to data collected and archived within the storage area network 5 by the storage system 6. The system 2 in turn communicates (e.g., arrow B) with the storage system 6 to select a set of LUNs within the storage system 6 related to the requested data and enable a secure reservation mode on the selected set of LUNs. The system 2 also generates a plurality of secret reservation keys for the selected set of LUNs and communicates (e.g., arrow A) with the distributed system 4 the plurality of secret reservation keys. In addition, when the data may is not initially located on the selected set of LUNs, the system 2 may place the data on the selected set of LUNs so that it may be accessed.

Further, the distributed system 4 then utilizes the communicated plurality of secret reservation keys to (e.g., arrow C) register with the storage system 6. Once registered, the distributed system 4 issue commands to the storage system 6 that establish secure persistent reserves to the selected set of LUNS and processes the data of the selected set of LUNs (e.g., the requested data). Processing may include, placing the data on the LUNs by the system 2 (e.g., arrow B) at any time and/or by the distributed system 4 once the distributed system 4 is registered and the secure persistent reserves are established. Processing may further include reading and/or writing of data while the data is protected by the secure reservation by any system 2 and/or registered distributed system 4 and include erasing the data from the LUNs after the reading and/or writing is complete. After the data has been processed, the distributed system 4 releases the secure persistent reserves and communicates (e.g., arrow A) to the system 2 that the secure persistent reserves have been released. In turn, the system 2 communicates (e.g., arrow B) with the storage system 6 to disable the secure reservation mode on the selected set of LUNs.

The environment 1 and elements therein may take many different forms and include multiple and/or alternate components and facilities. That is, while single items (e.g., the system 2, the communications network 3, the distributed system 4, the storage area network 5, and the storage system 6) are illustrated by FIG. 1, these representations are not intended to be limiting and thus, the system 2, the distributed system 4, and the storage system 6 may represent a plurality of computing devices that support the secure reservation mode and the secure persistent reserves. Further, the communications network 3, the storage area network 5, and arrows A-B are also representative, may represent a plurality of networks that support connections to and from the systems 2, 4, 6 of the environment 1.

For example, the system 2, the distributed system 4, and/or the storage system 6 may be computing devices as described above that includes processors, input/output interfaces, and memories. Each respective processor may receive computer readable program instructions from each respective memory and execute these instructions, thereby performing one or more processes defined by the system 2, the distributed system 4, or the storage system 6 (e.g., enabling the secure reservation mode by system 2 and issuing commands by distributed system 4 that establish the secure persistent reservations).

The processor may include any processing hardware, software, or combination of hardware and software utilized by the computing device that carries out the computer readable program instructions by performing arithmetical, logical, and/or input/output operations. Examples of the processor include, but are not limited to an arithmetic logic unit, which performs arithmetic and logical operations; a control unit, which extracts, decodes, and executes instructions from memory; and an array unit, which utilizes multiple parallel computing elements.

The input output (I/O) interface may include a physical and/or virtual mechanism utilized by the computing device to communicate between elements internal and/or external to the computing device. That is, the I/O interface may be configured to receive or send signals or data within or for the computing devices. An example of the I/O interface may include a network adapter card or network interface configured to receive computer readable program instructions from a network and forward the computer readable program instructions, original records, or the like for storage in a computer readable storage medium (e.g., memory) within a respective computing device.

The memory may include a tangible device that retains and stores computer readable program instructions for use by the processor of the computing device.

The system 2 is configured to respond to data access request, select a plurality of LUNs from a shared pool of LUN(s), enable the secure reservation mode on the selected plurality of LUNs, generate secret reservation keys, and disable the secure reservation mode on the selected plurality of LUNs. The system 2 may include an application client (e.g., generally within the computing device employing a computer operating system such as one of those mentioned above) that is configured to perform the above, respond, select, enable, generate, and disable operations. An application client is a type of client and is a piece of hardware, software, or combination of hardware and software that provides access to and/or accesses a service, such as access to data of a LUN. Examples of a client include a fat client that performs the bulk of any data processing operations itself, a thin client that use resources of the fat client, and a hybrid client that is a mixture of the fat and thin client models (e.g., processes locally and relies on a server for storing persistent data).

Thus, the application client is configured to enable and disable the secure reservation mode on a LUN, which permits secure persistent reserves to be in effect or not, and when enabled, provides secure access to the LUN. For example, the application client selects at least one LUN from a shared pool of LUNs, sets the secure reservation mode via a secure reservation mode (SRM) module on the at least one LUN (e.g., the SRM module being further described below), and generates a plurality of secure reservation keys via the SRM module respective to the at least one LUN (e.g., the SRM module may generally generate one secret reservation key per selected LUN, and thus if multiple LUNs are selected then multiple secret reservation keys are generated). The application client then communicates with the distributed system 4 that the data is available, e.g., by sending an instruction including the plurality of secret reservation keys to the distributed system 4 to register using the secret registration keys and issue persistent reserves to the selected LUNs for exclusive access, e.g., only for intended distributed systems. In response to the distributed system 4 communicating to the application client that the LUNs are no longer needed, the application client utilizes the SRM module to reset the secure reservation mode on the at least one LUN to and returns the selected LUNs to the pool for future selection.

The secure reservation mode (SRM) module may include computer readable program instructions configured to enable/disable the secure reservation mode on the selected LUNs and generate the plurality secret reservation keys for the selected LUNs (e.g., the SRM module may further be implemented as a process executed by the application client comprising the enabling/disabling of the secure reservation mode on the selected LUNs and generating of the plurality secret reservation keys for the selected LUNs). The secure reservation mode is a setting for a LUN that prevents access to the LUN and/or alterations to configurations associated with the LUNs (i.e., prevents processing data of the LUN or resetting the LUN entirely). That is, only a distributed system that registers utilizing a correct secret reservation key associated with a LUN can traverse the secure reservation mode to process the data of the LUN and/or alter the configurations, and/or a non-registered system cannot discover the secret reservation key by issuing queries to the storage system 6 when the LUN is in secure reservation mode (a non-registered system is a system that has not registered with the secret reservation key). Further, when the secure reservation mode is enabled for a LUN, the storage system 6 is automatically configured to not reveal any secret reservation keys to non-registered systems. Therefore, because the secret reservation keys are given by the systems 2, in response to the data request, to the distributed system 4 (which is the intended system), only the distributed system 4 can register with the storage system 6 and 'lock' or secure a persistent reserve (e.g., the secure persistent reserve) with the selected LUNs. The secret reservation key may be any value, examples of which include a random value, a non-zero value, an alpha-numeric value, a value of dynamic length, a randomized eight character value that is based on a variable such as time of generation, etc., or any combination thereof.

The distributed system 4 is configured to request access to data, utilize any received secret reservation keys to register with the storage system 6, issue commands to the storage system 6 to register with the received secret reservation keys and establish the secure persistent reservations to the LUNs under the secure reservation mode, process the data associated via the secure persistent reservations, release the secure persistent reservations, and communicate to the system 2 that the secure persistent reservations were released. The distributed system 4 may include a distributed client (e.g., generally within the computing device employing a computer operating system such as one of those mentioned above) that is configured to perform the above request, register, reserve, process, release and communicate operations. The distributed client also is a type of client and is a piece of hardware, software, or combination of hardware and software that provides access to and/or accesses a service, such as access to collected data. Thus, the distributed client is configured to issue secure persistent reserves for LUNs operating under the secure reservation mode in response to receiving from the application client the secret reservation keys for at least one selected LUN from the shared pool.

The storage system 6 may generally be included within a computing device employing a computer operating system such as one of those mentioned above, and accessed via a network, e.g., the storage area network 5, in any one or more of a variety of manners. The storage system 6 may include a database, data repository or other data store and may include various kinds of mechanisms for storing, accessing, and retrieving various kinds of data, including a hierarchical database, a set of files in a file system, an application database in a proprietary format, a relational database management system (RDBMS), etc. Thus, the storage system 6 is configured to include a plurality of addressable LUNs, where the addressability is gained using the combination of a logical address (00-FF), and within each logical address, a logical unit number (00-FF). Further, each addressable LUN may be configured by the system 2 to be in secure reservation mode. The storage system 6 may be a part of the storage area network 5, run independently within the storage area network 5 (as illustrated by FIG. 1), or be an external to the device or system (e.g., external to the storage area network 5) while being in communication with the systems 2, 4 and the storage area network 5. Thus, the systems 2, 4 may utilize the storage system 6 to provide data through the secure persistent reserve to the plurality of LUN(s) that have the secure reservation mode enabled.

Thus, the environment 1 (e.g., the secure reservation mode system) provides persistent, exclusive, and secure access via the secure reservation mode and the secure persistent reserves to data of the storage system 6 by the distributed system. For instance, when the storage systems 6 generally utilizes the SCSI protocol, the connections to the LUNs are not constant or persistent because the SCSI protocol includes inherent flaws that permit foreign systems (e.g., non-registered systems and/or systems other than the distributed system 4) to communicate with the storage system 6 and interrupt the connections (e.g., arrow C) to the distributed system 4. However, because the secret reservation key is generated and communicated (e.g., arrow A) separately by the system 2 to the distributed system 4, any foreign system that communicates with the storage system 6 in an attempt to retrieve the secret reservation key will fail (e.g., the storage system 6 in accordance with the secure reservation mode may output hide the secret reservation key, such as by outputting a set of zeroes to the foreign system). Without the secret reservation key, the foreign system will not be able to register with the storage system 6 and in turn will also be prevented from impersonating the distributed system 4 (e.g., accessing the LUNs and disconnecting a persistent reserve obtained by the distributed system 4). In effect, the secret reservation mode "hides" the distributed client's reservation key so that it remains secret, which is in contrast to how the persistent reserve as described above operated in such a way that any foreign system could discover the reservation keys from the data management system.

While the environment 1 is shown in FIG. 1, the components illustrated in FIG. 1 are not intended to be limiting. Indeed, additional or alternative components and/or implementations may be used. For example, it should be understood that the same operability of the system 2 and the distributed system 4 may be provided using any number and/or combination of differently named applications and modules. Further, although it is not specifically illustrated in the figures, the application client and the distributed client may include a user interface module and an application programmable interface module; however, these modules may be integrated with any other modules. A user interface module may include computer readable program instructions configured to generate and mange user interfaces that receive inputs and present outputs. An application programmable interface module may include computer readable program instructions configured to specify how other modules, applications, devices, and systems interact with each other.

Figure 2:
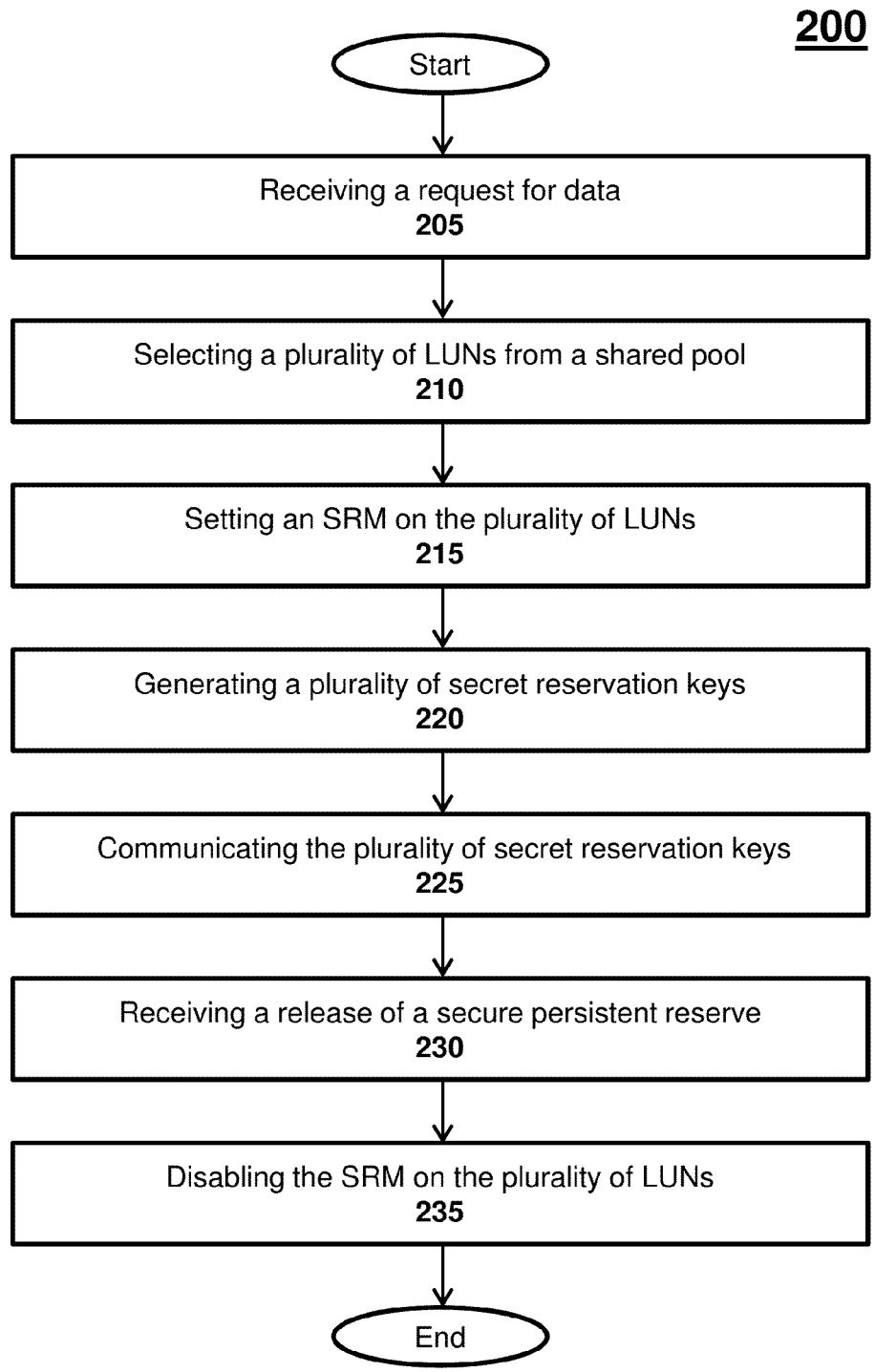
FIGS. 2 and 3 illustrate examples of process flow by environment for enabling a secure reservation mode.

The environment 1 will be described with reference to FIG. 2. FIG. 2 illustrates a process flow 200 of a secure reservation mode system.

The process 200 begins at block 205 when the application client receives (e.g., arrow A) a request for data from the distributed client. In response to the request, the application client at block 210 selects a plurality of LUNs from a shared pool of LUN(s). The number of selected target LUN(s) is based on the amount, type, and location of data being transferred.

At block 215, the application client utilizes the SRM module to set the secure reservation mode on the plurality of LUNs (e.g., the selected target LUN(s)). The application client also utilizes the SRM module to generate at block 220 a plurality of secure reservation keys for the selected target LUNs (e.g., the plurality of secure reservation keys is returned to the application client).

The process 200 proceeds to block 225 where the application client communicates (e.g., arrow A) to the distributed client the plurality of secure reservation keys, along with instructions that the selected target LUNs are ready for exclusive access. As indicated above, when the data is not initially located on the selected target LUNs, the application client may acquire the data from with the system 2 (e.g., locally) or a system connected to system 2 (e.g., externally) and place the data on the selected target LUNs so that it may be accessed.

The process 200 proceeds to block 230 where the application client receives (e.g., arrow A) from the distributed client that the data has been processes and the secure persistent reserves have been released. That is, the application client now identifies that the selected target LUN(s) are no longer needed.

The process 200 in turn proceeds to block 235 where the application client utilizes the SRM module to reset the selected target LUN(s), such the secure reservation mode is disabled and the selected target LUNs are return to the pool for future use.

The process 200 then ends.

If at any point, the distributed client fails during the processing of data, the application client may zero the data on the selected target LUN(s), disable the secure reservation mode on the selected target LUN(s), and return them to the pool for future use). For example, if the distributed client fails then the secure persistent reserve will remain as issued and the secure reservation mode as enabled for the selected LUN(s). In turn, the LUN will be unavailable and no foreign system will be able to reconfigure the LUN. In this case, the application client may cause the secure reservation mode of the selected target LUN(s) to be disabled and/or reset, which would release the secure persistent reserve.

Figure 3:
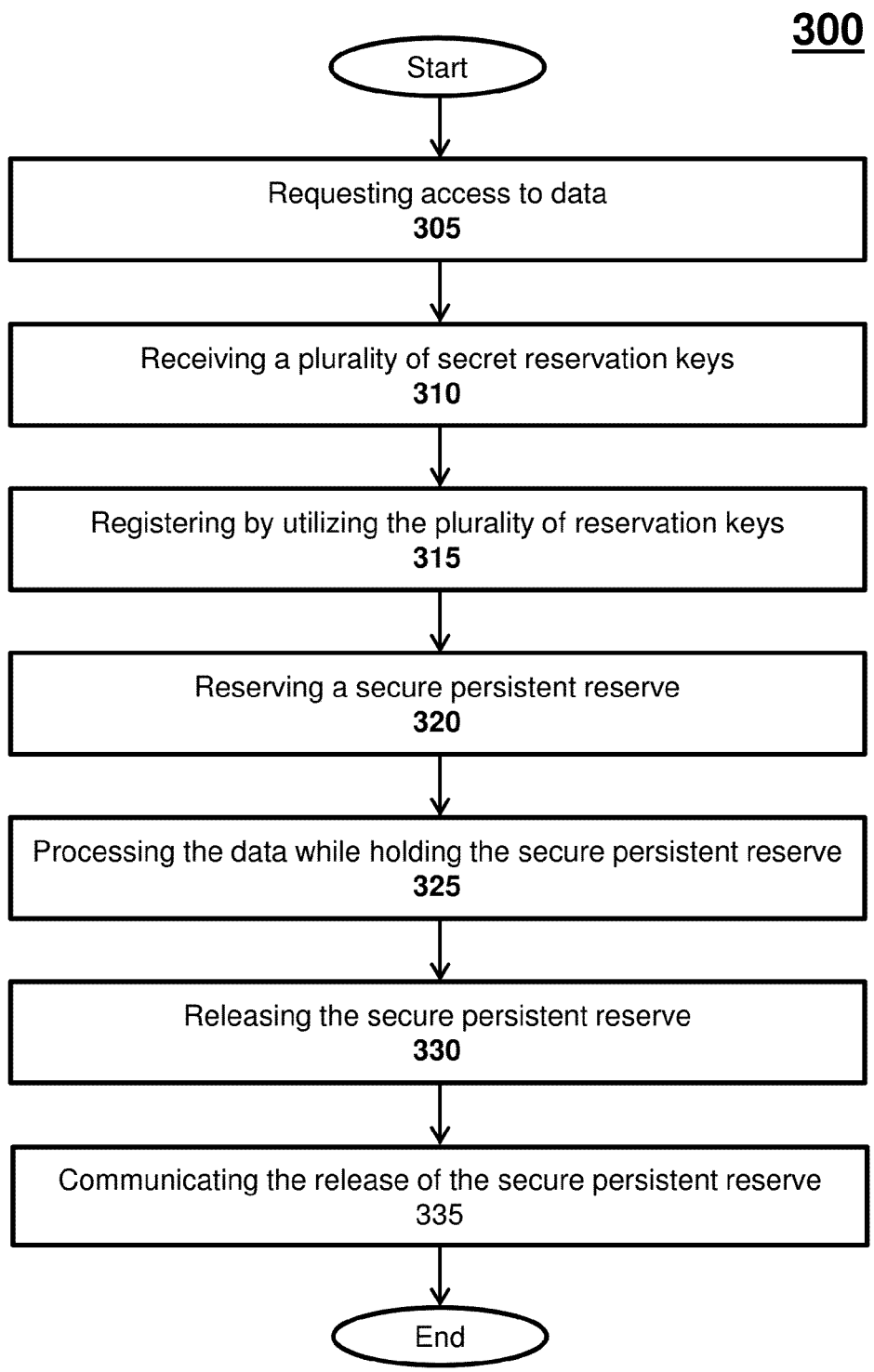

The environment 1 will be described with reference to FIG. 3. FIG. 3 illustrates a process flow 300 of a secure reservation mode system.

The process 300 begins at block 305 when the distributed client sends a request for data to the application client (e.g., arrow A). In turn, the distributed client receives at block 310 a plurality of secret reservation keys from the application client, where the plurality of secret reservation keys are associated with LUN(s) that correspond to the requested data.

At blocks 315 and 320, the distributed client communicates (e.g., arrow C) with the storage system 6 so as to register as an intended system by utilizing the plurality of secret reservation keys and to reserve a secure persistent reserve to the LUN(s) associated with the plurality of secret reservation keys. For example, under the SCSI protocol, the distributed client sends a SCSI register command, e.g., PERSISTENT RESERVE OUT sub-order REGISTER, to the storage system 6 that specifies the secret reservation key received from the application client and registers the distributed client. Then, the distributed client sends a SCSI reserve command, e.g., PERSISTENT RESERVE OUT sub-order RESERVE, to the storage system 6 that sets the LUN(s) to a reserve state, e.g., EXCLUSIVE ACCESS. The EXCLUSIVE ACCESS state is a state where only the distributed client that is registered will be able to access the LUN(s), e.g., process data to/from the LUN(s).

At block 325, the distributed client processes (e.g., arrow C) the data while holding the secure persistent reserve. Processing the data may include performing read and/or write operations of the data, such as reading the data from the storage system 6 and overwriting the data with zeroes. Further, because the secure reservation mode is enabled, if an initiator (e.g., a foreign system) that is not registered with the secret reservation key attempts to access the storage system 6 during processing, then the storage system 6 will return zeroes instead of the secret reservation keys of registered initiators (e.g., the distributed client). For examples, when the foreign system sends a SCSI reserve command, e.g., PERSISTENT RESERVE IN service action READ KEYS, the storage system 6 will return zeroes. Further, when the foreign system sends a SCSI reserve command, e.g., PERSISTENT RESERVE IN service action READ RESERVATION, the storage system 6 will return zeroes in the reservation key field when there is an active reservation, rather than the reservation holder's reservation key. Furthermore, any distributed system 4 is registered with the secret reservation key, may utilize the PERSISTENT RESERVE IN service action READ KEYS and the PERSISTENT RESERVE IN service action READ RESERVATION to cause the storage system 6 will to response correctly to the commands.

When the processing of the data is complete, the process 300 in turn proceeds to block 330 where the distributed client releases the secure persistent reserves. For example, under the SCSI protocol, the distributed client sends a SCSI release command, e.g., PERSISTENT RESERVE OUT sub-order RELEASE, to the storage system 6 that releases the persistent reserve.

As block 335, the distributed client communicates (e.g., arrow A) to the application client that the secure persistent reserves have been released, which indicates that the selected target LUN(s) are no longer needed.

The process 300 then ends.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A computer program product, the computer program product comprising a computer readable storage medium having program instructions embodied therewith, the program instructions executable by a processor to cause:
    enabling, by the processor, a secure reservation mode for a plurality of logical unit numbers of a storage system, the secure reservation mode secure enabling secure persistent reserves to the plurality of logical unit numbers;
    generating, by the processor, a plurality of secret reservation keys; and
    instructing, by the processor, a distributed client to utilize at least one of the secret reservation keys to register with the storage system and to issue the secure persistent reserves to the plurality of logical unit numbers;
    receiving, by the processor from the distributed client, an indication that the secure reservation mode was released; and
    in response to the indication, disabling the secure reservation mode for the plurality of logical unit numbers.

2. The computer program product of claim 1, the program instructions further executable by the processor to cause:
    receiving a request for data from the distributed client; and
    in response to the request for data, enabling the secure reservation mode for the plurality of logical unit numbers and generating the plurality of secret reservation keys for the plurality of logical unit numbers.

3. The computer program product of claim 1, the program instructions further executable by the processor to cause:
    selecting the plurality of logical unit numbers from a shared pool of logical unit numbers.

4. The computer program product of claim 1, the program instructions further executable by the processor to cause:
    associating the plurality of secret reservation keys with the plurality of logical unit numbers.

5. The computer program product of claim 1, further comprising:
    collecting data from a plurality of data stores associated with an application client.

6. The computer program product of claim 1, wherein the secret reservation key is a randomized eight character value that is based on a variable.

7. The computer program product of claim 1, wherein the secure persistent reserves are connections to the plurality of logical unit numbers that enable only an intended distributed system to access data associated with the plurality of logical unit numbers.

8. A system, comprising a processor and a memory, the system configured to:
    enable a secure reservation mode for a plurality of logical unit numbers of a storage system, wherein the secure reservation mode secure enables secure persistent reserves to the plurality of logical unit numbers;
    generate a plurality of secret reservation keys; and
    instruct a distributed client to utilize at least one of the secret reservation keys to register with the storage system and to issue the secure persistent reserves to the plurality of logical unit numbers;
    receive, from the distributed client, an indication that the secure reservation mode was release; and
    in response to the indication, disable the secure reservation mode for the plurality of logical unit numbers.

9. The system of claim 8, further configured to:
    receive a request for data from the distributed client; and
    in response to the request for data, enable the secure reservation mode for the plurality of logical unit numbers and generate the plurality of secret reservation keys for the plurality of logical unit numbers.

10. The system of claim 8, further configured to:
    select the plurality of logical unit numbers from a shared pool of logical unit numbers.

11. The system of claim 8, further configured to:
    associate the plurality of secret reservation keys with the plurality of logical unit numbers.

12. The system of claim 8, further configured to:
    collect data from a plurality of data stores associated with an application client.

13. The system of claim 8, wherein the secure persistent reserves are connections to the plurality of logical unit numbers that enable only an intended distributed system to access data associated with the plurality of logical unit numbers.

14. The system of claim 8, wherein the secret reservation key is a randomized eight character value that is based on a variable.

* * * * *